(12) United States Patent
Lee

(10) Patent No.: US 12,095,101 B2
(45) Date of Patent: Sep. 17, 2024

(54) CAP PLATE WELDING ASSEMBLY FOR ELECTRIC VEHICLE SECONDARY BATTERY

(71) Applicant: SP SYSTEMS CO., LTD., Yangsan-si (KR)

(72) Inventor: Sung Hwan Lee, Hwaseong-si (KR)

(73) Assignee: SP SYSTEMS CO., LTD., Yangsan-si (KR)

( * ) Notice: Subject to any disclaimer, the term of this patent is extended or adjusted under 35 U.S.C. 154(b) by 373 days.

(21) Appl. No.: 17/535,178

(22) Filed: Nov. 24, 2021

(65) Prior Publication Data

US 2023/0134810 A1 May 4, 2023

(30) Foreign Application Priority Data

Oct. 28, 2021 (KR) ........................ 10-2021-0145411

(51) Int. Cl.
*H01M 50/169* (2021.01)
*H01M 50/184* (2021.01)

(52) U.S. Cl.
CPC ....... *H01M 50/169* (2021.01); *H01M 50/184* (2021.01)

(58) Field of Classification Search
CPC .. H01M 50/169; H01M 50/184; H01M 50/55; H01M 50/271
See application file for complete search history.

(56) References Cited

FOREIGN PATENT DOCUMENTS

KR 20180001884 A * 1/2018 .......... H01M 50/147

OTHER PUBLICATIONS

Byun et al., "KR20180001884A English Translation", Jan. 5 (Year: 2018).*

* cited by examiner

*Primary Examiner* — Matthew T Martin
*Assistant Examiner* — Alexandra J Simmons
(74) *Attorney, Agent, or Firm* — United One Law Group LLC; Kongsik Kim; Jhongwoo Peck

(57) ABSTRACT

Provided is a cap plate welding assembly for an electric vehicle secondary battery, the cap plate welding assembly including: an anode part cap plate provided with first horizontal planes formed long in left and right directions on a front surface and a rear surface thereof, respectively, and first vertical planes perpendicular to the first horizontal planes and formed in front and rear directions on a left side surface and a right side surface thereof, respectively; and a cathode part cap plate provided with second horizontal planes formed long in the left and right directions on a front surface and a rear surface thereof, respectively, and second vertical planes formed in the front and rear directions on a left side surface and a right side surface thereof, respectively.

4 Claims, 5 Drawing Sheets

CAP PLATE WELDING ASSEMBLY FOR ELECTRIC VEHICLE SECONDARY BATTERY

CROSS REFERENCE TO RELATED APPLICATION

The present application claims priority to Korean Patent Application No. 10-2021-0145411 filed on Oct. 28, 2021, which is incorporated herein by reference in its entirety.

BACKGROUND

1. Technical Field

The present disclosure relates to a cap plate welding assembly for an electric vehicle secondary battery and, more particularly, to a cap plate welding assembly for an electric vehicle secondary battery that is capable of dramatically improving driving performance of an electric vehicle in such a manner that lengths of cap plates mounted on an upper part of a battery pack casing for electric vehicle secondary batteries are welded to each other to increase a width the cap plates, so that the width of the casing in which battery cells are accommodated is increased, thereby increasing a capacity of the battery cells and the secondary battery.

2. Description of the Related Art

In a conventional lithium polymer battery for an electric vehicle, a size of a casing in which a plurality of battery cells are accommodated is formed to be small, so there is a problem in that a size of the plurality of battery cells is unable to be increased, so a capacity of the battery cells is reduced.

In addition, in a conventional secondary battery for an electric vehicle, in order to increase a capacity of a casing in which a plurality of battery cells are accommodated, a length of a cap plate is increased rather than a width of the cap plate mounted on an upper part of the casing. As a result, when assembling a module, due to an increase in a volume of the battery cells, there is a problem in that a size of the module and the number of the battery cells inserted therein are reduced.

In addition, since the secondary battery for the electric vehicle is installed in the lower part of an electric vehicle, when the current battery cell structure in a square shape is applied, there is a problem in that the height of the electric vehicle may increase.

In addition, a shape, size, and capacity of a casing in which a plurality of battery cells is accommodated is standardized in a conventional secondary battery for an electric vehicle, so there is a problem in that it is difficult to improve the energy density value for increasing the mileage of the electric vehicle.

In addition, in a conventional press forming process, there are problems in that, not only is it difficult to manage a degree of flatness of a cap plate, which is a key to quality of parts, but also, when welding between a cap plate and a casing, productivity of the process is reduced due to excessive generation of welding sparks, and concerns of occurrence of fluid leak exist due to occurrence of pinholes due to poor welding.

The foregoing is intended merely to aid in the understanding of the background of the present disclosure and is not intended to mean that the present disclosure falls within the purview of the related art that is already known to those skilled in the art.

Documents of Related Art

Patent Document (Patent Document 1) KR 10-1212552

SUMMARY

Accordingly, the present disclosure has been made keeping in mind the above problems occurring in the related art, and the present disclosure is intended to provide a cap plate welding assembly for an electric vehicle secondary battery that is capable of dramatically improving driving performance of an electric vehicle in such a manner that lengths of two cap plates mounted on an upper part of a battery pack casing for electric vehicle secondary batteries are welded to each other to increase a width of a cap plate, so that the width of the casing in which battery cells are accommodated is increased, thereby increasing a capacity of the battery cells and the secondary battery.

In order to achieve the above objective, according to one aspect of the present disclosure, there may be provided a cap plate welding assembly 10 for an electric vehicle secondary battery provided with an anode part 51 and a cathode part 61 fixedly inserted on an upper surface thereof and coupled to an upper part of a battery pack casing 5 for the electric vehicle secondary battery, the cap plate welding assembly 10 for an electric vehicle secondary battery, including: an anode part cap plate 20 formed long in left and right directions in a shape of a square plate material; and a cathode part cap plate 30 formed in the same size as the anode part cap plate 20 and having one side surface thereof coupled by welding to an opposite side surface of the anode part cap plate 20, wherein the anode part cap plate 20 is provided with first horizontal planes 21 formed long in the left and right directions on a front surface and a rear surface thereof, respectively, and first vertical planes 22 perpendicular to the first horizontal planes 21 and formed in front and rear directions on a left side surface and a right side surface thereof, respectively, the cathode part cap plate 30 is provided with second horizontal planes 31 having the same shape and size as the first horizontal planes 21 and formed long in the left and right directions on a front surface and a rear surface thereof, respectively, and second vertical planes 32 having the same shape and size as the first vertical planes 22 and formed in the front and rear directions on a left side surface and a right side surface thereof, respectively, and the first vertical planes 22 include one first vertical plane coupled by welding to associated one second vertical plane of the second vertical planes 32, the associated one second vertical plane being opposite to the one first vertical plane.

In addition, the anode part cap plate 20 may be provided with a first seating part 23, on which a lower portion of the anode part 51 may be seated, and which may be recessed to be formed on a right side of an upper surface thereof, the cathode part cap plate 30 may be provided with a second seating part 33, on which a lower portion of the cathode part 61 may be seated, and which may be recessed to be formed on a left side of an upper surface thereof, and coupling by welding may be performed between the first vertical plane 22 most distant from the first seating part 23 of the anode part cap plate 20 and the second vertical plane 32 most distant from the second seating part 33 of the cathode part cap plate 30.

In addition, the coupling by welding may include: tack welding for temporarily fixing the one first vertical plane 22 and the associated one second vertical plane 32 opposite to the one first vertical plane 22; and main welding performed in earnest after the tack welding, wherein, in the tack welding, the one first vertical plane 22 and the associated one second vertical plane 32 opposite to the one first vertical plane 22 are temporarily welded by conduction welding.

In addition, in the tack welding, a welding point 40 may be formed on an upper portion of the one first vertical plane 22 and an upper portion of the associated one second vertical plane 32 opposite to the one first vertical plane 22, the welding point 40 may include: a first welding point 41 formed at one upper end of the one first vertical plane 22 and one upper end of the associated one second vertical plane 32 opposite to the one first vertical plane 22; and a second welding point 42 formed at an opposite upper end of the one first vertical plane 22 and an opposite upper end of the associated one second vertical plane 32 opposite to the one first vertical plane 22, wherein, in the main welding, the one first vertical plane 22 and the associated one second vertical plane 32 opposite to the one first vertical plane 22 may be coupled by welding to each other by the conduction welding from the first welding point 41 to the second welding point 42.

In addition, the one first vertical plane 22 and the associated one second vertical plane 32 opposite to the one first vertical plane 22 may be coupled by melting by a laser beam illuminated in a direction of gravity from a laser welding machine.

As described above, in a cap plate welding assembly for an electric vehicle secondary battery according to the present disclosure, two cap plates mounted on an upper part of a battery pack casing for the electric vehicle secondary battery are put together and lengths of the cap plates can be welded to each other to increase a width of a cap combining the two cap plates, thereby allowing a width of the casing to be increased. As a result, in the cap plate welding assembly for an electric vehicle secondary battery according to the present disclosure, it is possible to increase a capacity of battery cells accommodated in the casing, thereby increasing a capacity of a secondary battery. Accordingly, there can be provided an effect of dramatically improving driving performance of an electric vehicle.

In addition, the cap plate welding assembly for an electric vehicle secondary battery according to the present disclosure increases the width rather than the length of the cap plate so that there can be provided an effect of not only improving assembling of the module and reducing an area occupied by the battery cells but also increasing the capacity of the battery cells.

In addition, the cap plate welding assembly for an electric vehicle secondary battery according to the present disclosure can lower the height of the casing accommodating a plurality of the battery cells, thereby providing an effect of reducing the height of an electric vehicle.

In addition, the cap plate welding assembly for an electric vehicle secondary battery according to the present disclosure can efficiently cope with a breaking pressure thanks to an improvement of the strength of a welding part when a battery cell is defective or a high pressure is generated for the battery cells, thereby having an effect of ensuring safety with respect to an explosion of the battery cell.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, an embodiment of the present disclosure will be described with reference to the accompanying drawings in order to describe in detail enough that a person of ordinary skill in the art to which the present disclosure pertains may easily implement the technical idea of the present disclosure.

However, the following examples are merely examples to help the understanding of the present disclosure, thereby not reducing or limiting the scope of the present disclosure. In addition, the present disclosure may be embodied in several different forms and is not limited to the embodiments described herein.

The cap plate welding assembly 10 for an electric vehicle secondary battery according to the present disclosure is provided with an anode part 51 and a cathode part 61 fixedly inserted to an upper surface thereof, and the cap plate welding assembly 10 is coupled to an upper part of a battery pack casing 5 for a secondary battery.

Figure 1:
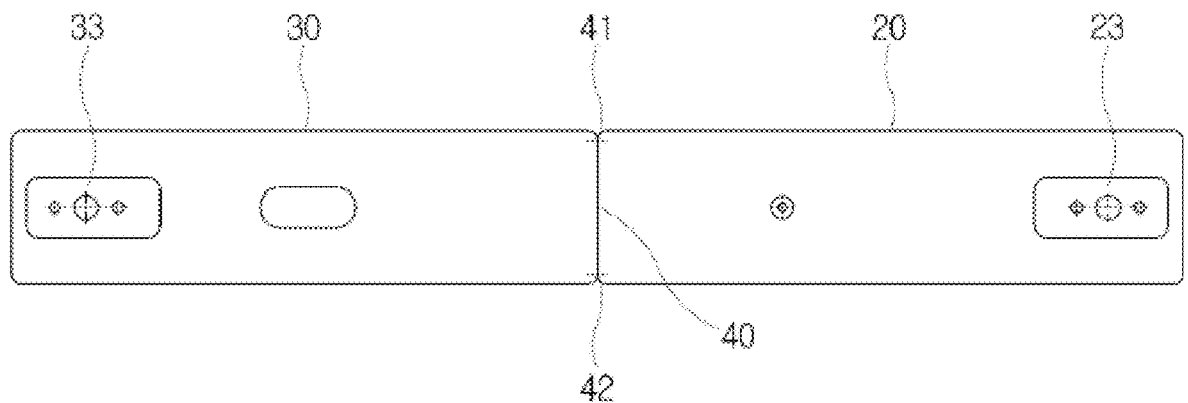
FIG. 1 is a configuration diagram of a cap plate welding assembly for an electric vehicle secondary battery according to the present disclosure.

FIG. 1 is a configuration diagram of a cap plate welding assembly for an electric vehicle secondary battery according to the present disclosure.

With reference to FIG. 1, the cap plate welding assembly for an electric vehicle secondary battery according to the present disclosure includes an anode part cap plate 20 and a cathode part cap plate 30.

First, the anode part cap plate 20 is formed long in left and right directions in a shape of a square plate material. In this case, the anode part cap plate 20 is formed of an aluminum material.

In addition, the cathode part cap plate 30 is formed in the same size as the anode part cap plate 20 and having one side surface thereof coupled by welding to an opposite side surface of the anode part cap plate 20. In this case, the cathode part cap plate 30 is formed of an aluminum material.

Figure 2:
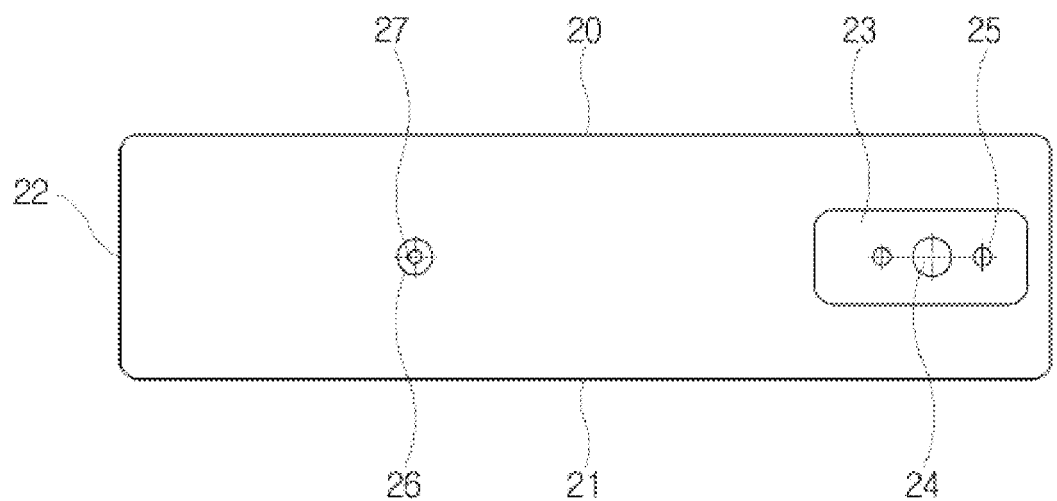
FIG. 2 is a plan view of an anode part cap plate shown in FIG. 1.
Figure 3:
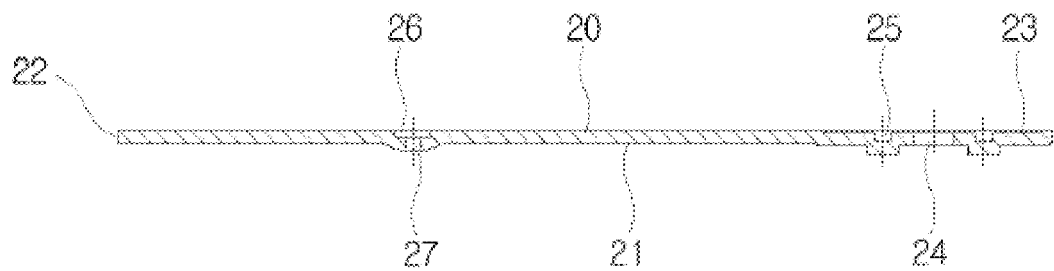
FIG. 3 is a front sectional view of the anode part cap plate shown in FIG. 2.

FIG. 2 is a plan view of an anode part cap plate 20 shown in FIG. 1, and FIG. 3 is a front sectional view of the anode part cap plate 20 shown in FIG. 2.

With reference to FIGS. 1 to 3, first horizontal planes 21 are formed long in left and right directions on a front surface and a rear surface of the anode part cap plate 20, respectively, and on a left side surface and a right side surface of the anode part cap plate 20, first vertical planes 22 perpendicular to the first horizontal planes 21 are formed in front and rear directions, respectively.

At this time, a length in the left and right directions of the first horizontal planes 21 is formed to be longer than a length in front and rear directions of the first vertical planes 22, and a length in a vertical direction of the first horizontal planes 21 is formed to be equal to a length of the vertical direction of the first vertical planes 22.

In addition, on an upper right side of an upper surface the anode part cap plate 20, a first seating part 23, on which a lower portion of the anode part 51 (not shown) is seated, is recessed to be formed.

Figure 4:
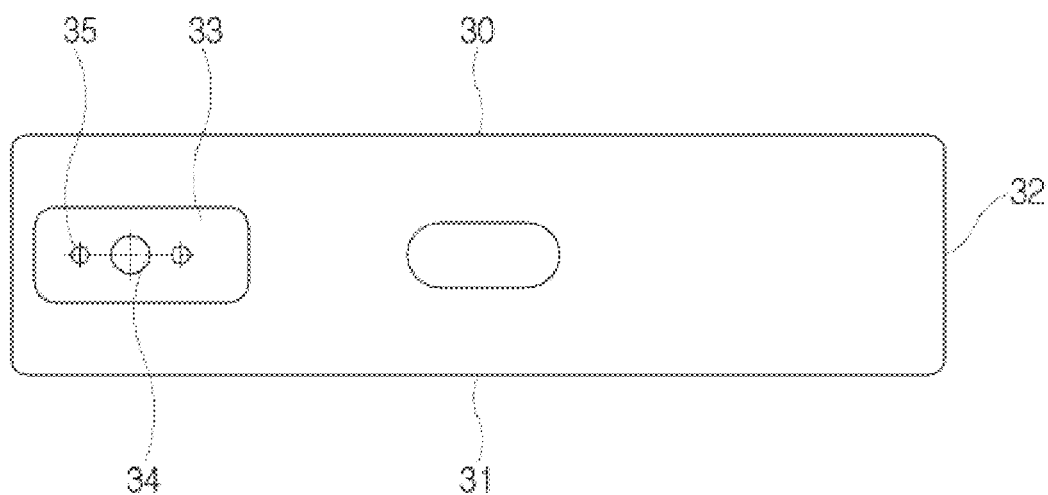
FIG. 4 is a plan view of a cathode part cap plate shown in FIG. 1.
Figure 5:
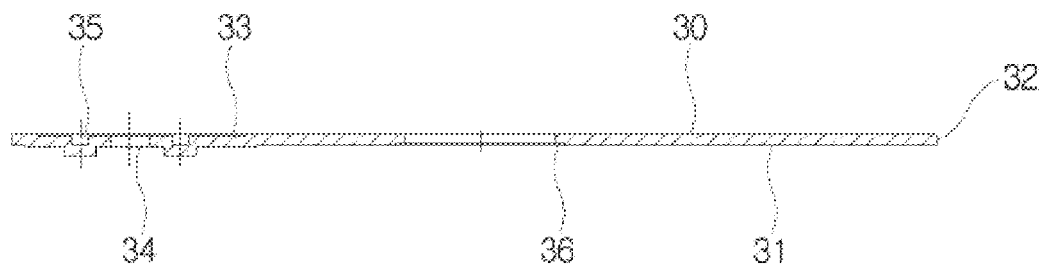
FIG. 5 is a front sectional view of the cathode part cap plate shown in FIG. 4.

FIG. 4 is a plan view of a cathode part cap plate shown in FIG. 1, and FIG. 5 is a front sectional view of the cathode part cap plate shown in FIG. 4.

With reference to FIGS. 1, 4 and 5, on a front surface and a rear surface of the cathode part cap plate 30, second horizontal planes 31 having the same shapes and sizes as the first horizontal planes 21 are formed long in the left and right directions, respectively, and on a left side surface and a right side surface of the cathode part cap plate 30, second vertical planes 32 having the same shapes and sizes as the first vertical planes 22 and being perpendicular to the second horizontal planes 31 are formed in the front and rear directions, respectively.

In addition, on a left side of an upper surface of the cathode part cap plate 30, a second seating part 33, on which a lower portion of the cathode part 61 (not shown) is seated.

In addition, one first vertical plane of the first vertical planes 22 is coupled by welding to associated one second vertical plane, opposite to the one first vertical plane, of the second vertical planes 32.

Specifically, coupling by welding is performed between the first vertical plane 22 most distant from a first seating part 23 of the anode part cap plate 20 and the second vertical planes 32 most distant from the second seating part 33 of the cathode part cap plate 30.

In addition, the coupling by welding of the anode part cap plate 20 and the cathode part cap plate 30 includes tack welding and main welding.

First, the tack welding is a welding method performed to temporarily fix the anode part cap plate 20 and the cathode part cap plate 30.

Specifically, in the tack welding, the one first vertical plane 22 and the associated one second vertical plane 32 opposite to the one first vertical plane 22 are temporarily welded by conduction welding. In this case, the conduction welding refers to a laser welding method by heat conduction applied when the base material is a thin plate or an output of the laser beam is small.

When welded by general welding, a hole such as a pinhole and the like may be generated at a welding part between base metals, or a phenomenon of bending of the base metal may occur. However, when welded by conduction welding, the welding part between the base materials is hardly overheated, so that pinholes or bending of the base materials hardly appear.

Specifically, the one first vertical plane 22 and the associated one second vertical plane 32 opposite to the one first vertical plane 22 are coupled by melting by a laser beam illuminated in a direction of gravity from a laser welding machine.

In addition, in the tack welding, a welding point 40 is formed on an upper portion of the one first vertical plane 22 and an upper portion of the associated one second vertical plane 32 opposite to the one first vertical plane 22.

At this time, the welding point 40 includes a first welding point 41 and a second welding point 42.

First, the first welding point 41 is formed at one upper end of the one first vertical plane 22 and one upper end of the associated one second vertical plane 32 opposite to the one first vertical plane 22.

In addition, the second welding point 42 is formed at an opposite upper end of the one first vertical plane 22 and an opposite upper end of the associated one second vertical plane 32 opposite to the one first vertical plane 22.

In addition, the main welding means a welding method that is performed in earnest after the tack welding.

Specifically, in the main welding, the one first vertical plane 22 and the associated one second vertical plane 32 opposite to the one first vertical plane 22 are coupled by welding to each other by the conduction welding from the first welding point 41 to the second welding point 42.

Meanwhile, after the anode part cap plate 20 and the cathode part cap plate 30 are coupled by welding together, a leak test and a tensile strength test are performed.

First, the leak test means a test for checking whether a fluid leaks from a welding part of the cap plate welding assembly 10 for an electric vehicle secondary battery.

In addition, the tensile strength test refers to a test for pulling the welded assembly to a preset reference load and then for obtaining the tensile strength of the welded part of the welded assembly from the reference load and the deformed shape of the welded assembly.

Meanwhile, on a center of an upper surface of the first seating part 23 of the anode part cap plate 20, a first through hole 24, into which a first bolt 52 (not shown) configured to fix the anode part 51 is inserted by passing through, is formed by passing through, and on opposite sides of the upper surface of the first seating part 23, a first coupling hole 25, to which a lower portion of the anode part 51 is fixedly coupled, is recessed to be formed.

In addition, on a left side of the upper surface of the anode part cap plate 20, a first upper insertion hole 26 recessed to be formed, and on a lower surface of the first upper insertion hole 26, a first lower insertion hole 27 is formed by passing through.

In addition, on the center of the upper surface of the cathode part cap plate 30, a fixing hole 36 is recessed to be formed.

In addition, on a center of an upper surface of the second seating part 33 of the cathode part cap plate 30, a second through hole 34, into which a second bolt 62 (not shown) configured to fix the cathode part 61 is inserted by passing through, is formed by passing through, and on opposite sides of the upper surface of the second seating part 33, a second coupling hole 35, to which a second protrusion portion of the cathode part 61 is fixedly coupled, is recessed to be formed.

In the cap plate welding assembly 10 for an electric vehicle secondary battery according to the present disclosure, two cap plates mounted on an upper part of a battery pack casing 5 for the electric vehicle secondary battery are put together and lengths of the cap plates may be welded to each other to increase a width of a cap combining the two cap plates, thereby allowing a width of the casing 5 to be increased. As a result, in the cap plate welding assembly 10 for an electric vehicle secondary battery according to the present disclosure, it is possible to increase a capacity of battery cells accommodated in the casing 5, thereby increasing a capacity of a secondary battery. Accordingly, there may be provided an effect of dramatically improving driving performance of an electric vehicle.

In addition, the cap plate welding assembly 10 for an electric vehicle secondary battery according to the present disclosure increases the width rather than the length of the cap plate so that there may be provided an effect of not only improving assembling of the module and reducing an area occupied by the battery cells but also increasing the capacity of the battery cells.

In addition, the cap plate welding assembly 10 for an electric vehicle secondary battery according to the present disclosure may lower the height of the casing 5 accommodating a plurality of the battery cells, thereby providing an effect of reducing the height of an electric vehicle.

In addition, the cap plate welding assembly 10 for an electric vehicle secondary battery according to the present disclosure may efficiently cope with a breaking pressure thanks to an improvement of the strength of the welding part when a battery cell is defective or a high pressure is generated for the battery cells, thereby having an effect of ensuring safety with respect to an explosion of the battery cell.

As described above, the present disclosure has a main technical idea to provide the side structure of a battery pack for an automotive secondary battery, and the embodiment described above with reference to the drawings is only one embodiment. In addition, the true scope of the present disclosure is based on the claims but will also extend to even equivalent embodiments that may exist in various ways.

What is claimed is:

1. A cap plate welding assembly (10) for an electric vehicle secondary battery provided with an anode part (51) and a cathode part (61) fixedly inserted on an upper surface thereof and coupled to an upper part of a battery pack casing (5) for the electric vehicle secondary battery, the cap plate welding assembly (10) for an electric vehicle secondary battery, comprising:
    an anode part cap plate (20) formed long in left and right directions in a shape of a square rectangular plate material; and
    a cathode part cap plate (30) formed in the same size as the anode part cap plate (20) and having one side surface thereof coupled by welding to an opposite side surface of the anode part cap plate (20),
    wherein the anode part cap plate (20) is provided with first horizontal planes (21) formed long in the left and right directions on a front surface and a rear surface thereof, respectively, and first vertical planes (22) perpendicular to the first horizontal planes (21) and formed in front and rear directions on a left side surface and a right side surface thereof, respectively,
    wherein the cathode part cap plate (30) is provided with second horizontal planes (31) having the same shape and size as the first horizontal planes (21) and formed long in the left and right directions on a front surface and a rear surface thereof, respectively, and second vertical planes (32) having the same shape and size as the first vertical planes (22) and formed in the front and rear directions on a left side surface and a right side surface thereof, respectively, and
    wherein the first vertical planes (22) include one first vertical plane coupled by welding to associated one second vertical plane of the second vertical planes (32), the associated one second vertical plane being opposite to the one first vertical plane,
    wherein the anode part cap plate (20) is provided with a first seating part (23), on which a lower portion of the anode part (51) is seated, and which is recessed to be formed on a right side of an upper surface thereof,
    wherein the cathode part cap plate (30) is provided with a second seating part (33), on which a lower portion of the cathode part (61) is seated, and which is recessed to be formed on a left side of an upper surface thereof, and
    wherein coupling by welding is performed between the first vertical plane (22) most distant from the first seating part (23) of the anode part cap plate (20) and the second vertical plane (32) most distant from the second seating part (33) of the cathode part cap plate (30).

2. The cap plate welding assembly for an electric vehicle secondary battery of claim 1, wherein the coupling by welding comprises:
    tack welding for temporarily fixing the one first vertical plane (22) and the associated one second vertical plane (32) opposite to the one first vertical plane (22); and
    main welding performed in earnest after the tack welding,
    wherein, in the tack welding, the one first vertical plane (22) and the associated one second vertical plane (32) opposite to the one first vertical plane (22) are temporarily welded by conduction welding.

3. The cap plate welding assembly for an electric vehicle secondary battery of claim 2, wherein, in the tack welding, a welding point (40) is formed on an upper portion of the one first vertical plane (22) and an upper portion of the associated one second vertical plane (32) opposite to the one first vertical plane (22),
    wherein the welding point (40) comprises:
        a first welding point (41) formed at one upper end of the one first vertical plane (22) and one upper end of the associated one second vertical plane (32) opposite to the one first vertical plane (22); and
        a second welding point (42) formed at an opposite upper end of the one first vertical plane (22) and an opposite upper end of the associated one second vertical plane (32) opposite to the one first vertical plane (22), and
    wherein, in the main welding, the one first vertical plane (22) and the associated one second vertical plane (32) opposite to the one first vertical plane (22) are coupled by welding to each other by the conduction welding from the first welding point (41) to the second welding point (42).

4. The cap plate welding assembly for an electric vehicle secondary battery of claim 3, wherein the one first vertical plane (22) and the associated one second vertical plane (32) opposite to the one first vertical plane (22) are coupled by melting by a laser beam illuminated in a direction of gravity from a laser welding machine.

* * * * *